Feb. 7, 1950     C. H. M. SCHAMBLIN     2,496,601
VEHICLE SIGNAL LAMP
Filed May 28, 1948     2 Sheets—Sheet 1
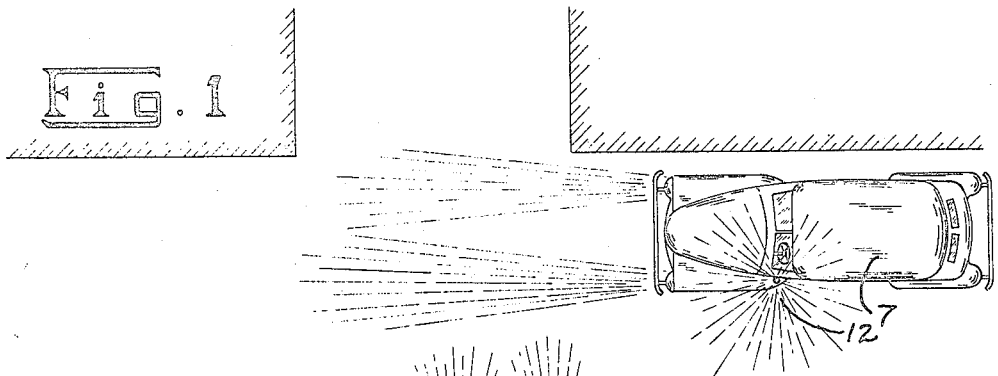
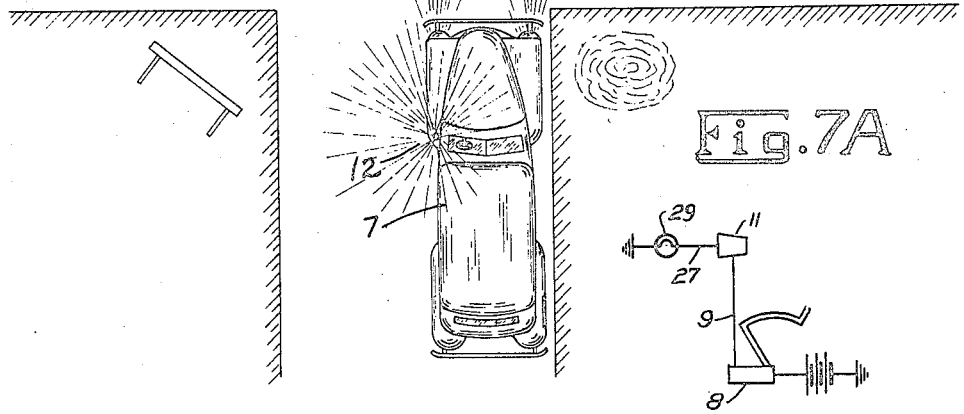
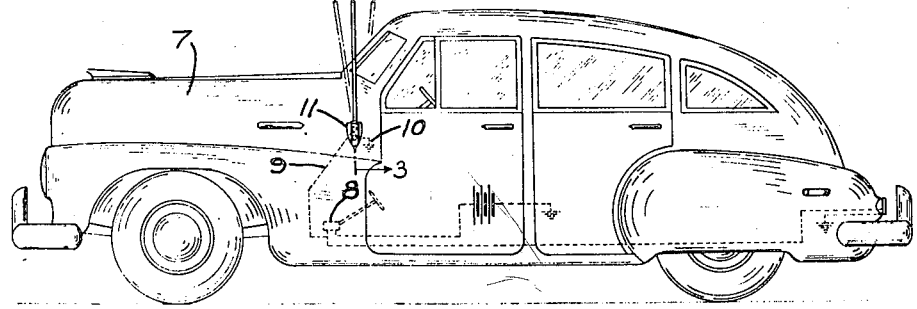
INVENTOR.
Charles H. M. S. Schamblin

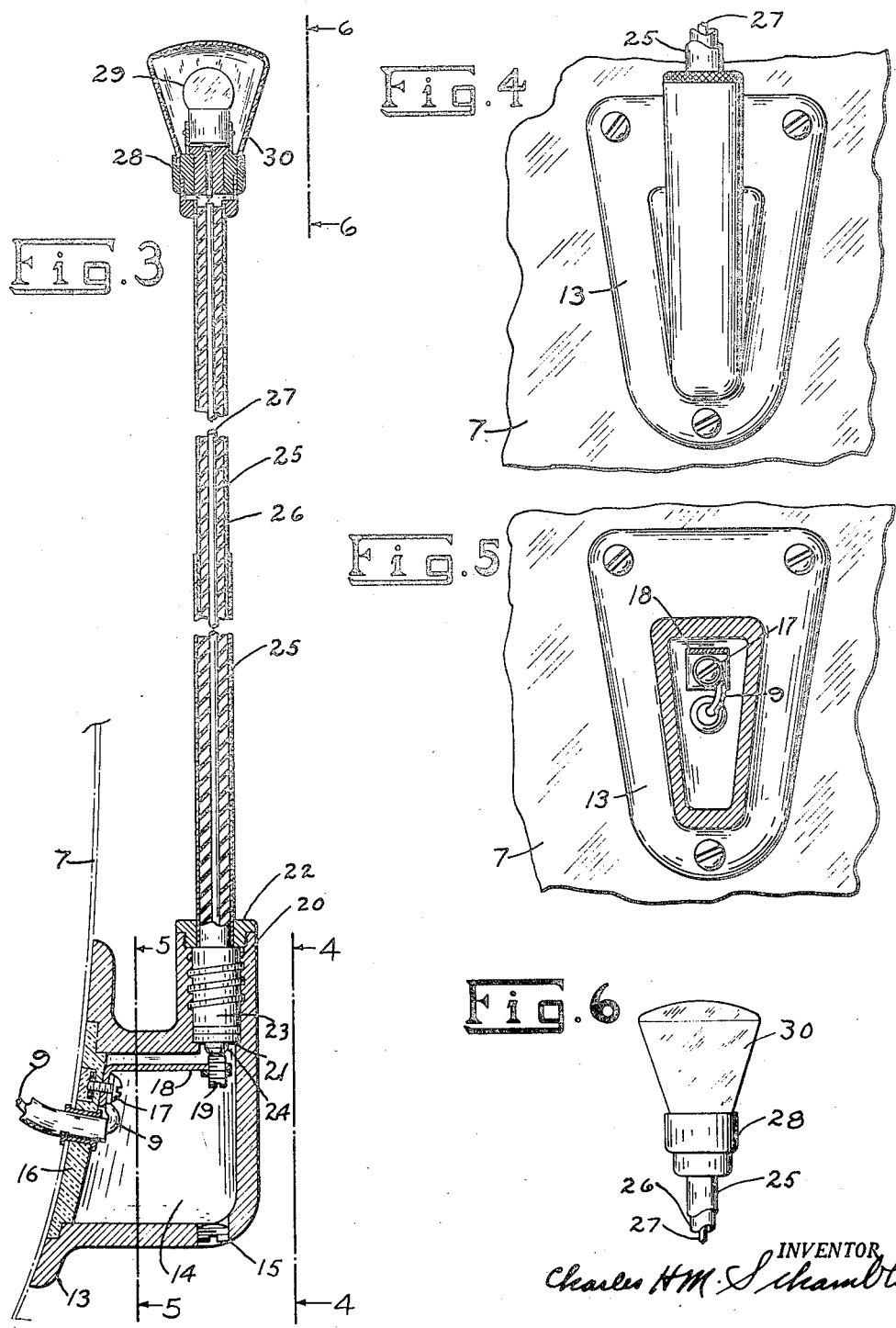

Patented Feb. 7, 1950

2,496,601

UNITED STATES PATENT OFFICE 2,496,601

VEHICLE SIGNAL LAMP

Charles H. M. Schamblin, Bakersfield, Calif.

Application May 28, 1948, Serial No. 29,750

1 Claim. (Cl. 177—329)

The general purpose of my invention is to provide for vehicular use a visual signal which will be distinctive and specially noticeable by reason of its motion when viewed from points at or near a right angle or side location; particularly as a supplement to normal motor vehicle headlight beams which are more or less difficult to discern when pointed across a highway from a vehicle stationed on a side road waiting to cross the main highway. In furtherance of this purpose my signal lamp is mounted on the front section of the vehicle and is provided with an extended tube so flexible that stopping and starting the vehicle causes the signal to sway back and forth in a line parallel to the line of travel of the vehicle to which it is attached.

A further advantage of my invention is that by connecting the lamp to the foot brake lamp signal circuit it will be lighted whenever the brake pedal is operated.

Another object of my invention is to provide a signal which will be located above the top of the vehicle and thus visible over low growing shrubbery or other obstacles.

A further important object is to provide a lamp of simple and rugged construction with however enough flexibility of the mounting rod to bend and pass under overhanging obstacles such as tree limbs, garage doors, etc. without breakage or damage.

Another object is that of providing an automotive accessory which will be reasonable in cost but at the same time present an attractive appearance and which has the advantage of being an easily understood device warning of dangerous conditions which require the exercise of caution on the part of the approaching vehicle operator.

Another advantage of my device is that easily operated provisions are made for the quick adjustment and change of defective parts.

A further object is to provide a waving or swaying signal which may be located as desired either near the windshield or at the front end of the vehicle as for example, on the fender, hood, or other appropriate place.

Additional objects and advantages will be apparent from the following description considered in conjunction with the accompanying sheets of drawings or from both as supplements of each other, wherein are set forth certain novel features of construction, combination and arrangement of parts and functions.

In the accompanying sheets of drawings forming a part of these specifications, and in which like numerals are employed to designate like parts:

Figure 1 is a plan view of a highway intersection showing my device attached to motor vehicle approaching at angular directions.

Figure 2 is a side elevation of the motor vehicle showing my device attached to it, and also indicating the method of connecting to the electro-mechanical braking system.

Figure 3 is a vertical cross-section of the signal mounted on a motor vehicle.

Figure 4 is a front elevation of the mounting bracket.

Figure 5 is a partial section and elevation of the mounting bracket taken on the line 5—5 in Fig. 3.

Figure 6 is an elevation of the lamp socket and shade.

Figure 7A is a wiring diagram.

Referring now in detail to Figures 1, 2, 3, 4, 5, and 6 wherein for purposes of illustration are shown preferred embodiments of my invention, the numeral 7 indicates a motor vehicle to which is attached signal 12 by mounting bracket 11, thus grounding the bracket as diagrammatically indicated at 10. From mounting bracket 11 an insulated wire 9 leads to and is connected to the foot brake warning signal switch 8.

The mounting bracket 11 is provided with a base frame 13 attached to the side of vehicle body 7 by appropriate means and securing thereto insulating plate 16. Within base frame 13 is provided a recess 14 housing the wire and connection details. Through insulating base 16 passes the insulated wire 9 which is terminated between binding screw 17 and connecting bar 18. Connecting bar 18 is provided with an adjustable contact screw 19 which may be appropriately positioned by means of a screwdriver inserted through access port 15.

A threaded socket 20 is provided in base frame 13 to receive the threaded base 23 of flexible tubular shell 25 which is held in firm position against shoulder stop 21 and locked by threaded water-proof gasket 22.

To threaded base 23 is securely fastened the flexible tubular shell 25 within which wire 27 is located and surrounded by insulator 26. Wire 27 extends through the bottom of threaded base 23 and is attached to a contact button 24 adapted to position against contact adjusting screw 19. At a suitable location on flexible tubular shell 25 is secured lamp socket assembly 28 to which is attached wire 27. A lamp 29 is releasably secured in lamp socket assembly 28 and is surrounded by a shade 30 releasably attached to lamp socket assembly 28.

In the utilization of my vehicle signal lamp a motor car driver proceeding at reasonable speed on a highway will perceive the approach of a cross-road and immediately apply his brakes. This action, since my signal is connected to the brake signal system, immediately lights up the lamp and the braking action retards the speed of the vehicle bringing it to a stop. As soon as the brake is applied and the car speed decreases, the weight of the lamp and socket assembly tends to bend the flexible rod and carry the signal lamp forward. When the car stops the forward movement of the signal lamp reaches the maximum position and the elasticity of the rod springs back in a reverse direction; this series of alternating direction movements continues until the signal lamp finally attains a position of rest. A driver approaching at right angles on the other highway very readily notices the moving light and consequently is warned to reduce his own speed or proceed with caution until the action of the first driver to reach the crossing is completed. Since my signal is practically automatic in operation and possesses unusual attention attracting power because of its height and oscillating motion I believe that it provides an important new warning device and should become a valuable supplement to the existing safety devices now available.

It will be understood that while the form of my vehicle signal lamp herein illustrated and described is to be considered as a preferred embodiment of my invention, I do not limit myself to the precise constructions as disclosed, but reserve the right to resort to and substitute various modifications and changes in shape, size and arrangement of parts without departing from the spirit of my invention or the scope of my claims as described and indicated above and in the drawings and the following claim.

Having thus described my invention, I claim:

A warning signal for attachment to a motor vehicle comprising; a lamp; a socket for said lamp, said socket providing with an insulated terminal; an insulated wire attached to said insulated terminal; means for grounding said socket; a bracket suitable for attachment to said motor vehicle; a flexible tubular shell connecting said socket to said bracket; said flexible tubular shell forming a conduit for insertion of said insulating wire; a threaded recess in said bracket; a threaded base attached to said tubular shell and adapted to fit said threaded recess; a threaded gasket securing said flexible tubular shell in said threaded recess; said insulated wire extending through said threaded base of said flexible tubular shell; a contact button attached to the insulated wire extending through said threaded base; an insulated terminal plate provided in said bracket; a threaded wire terminal located on said insulated terminal plate; a connecting bar attached to said threaded wire terminal and insulated terminal plate; an adjustable contact screw provided in said connecting bar and positioned to bear against said contact button; an access port provided in said bracket and adapted for insertion of a screwdriver in order to position said adjustable contact screw; an insulated conductor passing through said insulated terminal plate and adapted for attachment to the motor vehicle brake switch and serving as a source of energy to operate said lamp; all combined to provide a signal light which moves alternately forward and backward in the direction of the line of travel of said motor vehicle when the motion of said motor vehicle is changed by the application of the motor vehicle's brakes.

CHARLES H. M. SCHAMBLIN.

REFERENCES CITED

The following references are of record in the file of this patent:

UNITED STATES PATENTS

| Number | Name | Date |
|---|---|---|
| 1,142,650 | Wilhelm | June 8, 1915 |
| 1,189,076 | Eisendrath et al. | June 27, 1916 |
| 1,231,331 | Cole | June 26, 1947 |